(12) United States Patent
Brown

(10) Patent No.: US 7,950,726 B2
(45) Date of Patent: May 31, 2011

(54) AIR RIDE SYSTEM FOR A TRACTOR CAB

(76) Inventor: Keith R. Brown, Central City, NE (US)

(*) Notice: Subject to any disclaimer, the term of this patent is extended or adjusted under 35 U.S.C. 154(b) by 442 days.

(21) Appl. No.: 11/840,506

(22) Filed: Aug. 17, 2007

(65) Prior Publication Data

US 2009/0045000 A1 Feb. 19, 2009

(51) Int. Cl.
*B62D 33/06* (2006.01)
(52) U.S. Cl. .................................. 296/190.07
(58) Field of Classification Search ............. 296/190.01, 296/190.04, 190.05, 190.07
See application file for complete search history.

(56) References Cited

U.S. PATENT DOCUMENTS

| | | | | |
|---|---|---|---|---|
| 3,599,814 A * | 8/1971 | Brownfield | ................... | 414/718 |
| 3,966,009 A * | 6/1976 | Meacock et al. | ........... | 180/89.15 |
| 4,438,970 A * | 3/1984 | Boucher | ................... | 296/190.07 |
| 5,553,911 A * | 9/1996 | Bodin et al. | ............. | 296/190.07 |
| 5,579,860 A * | 12/1996 | Halverson et al. | ......... | 180/89.14 |
| 5,603,387 A * | 2/1997 | Beard et al. | ................ | 180/89.12 |
| 5,975,508 A * | 11/1999 | Beard | ............................ | 267/136 |
| 6,029,764 A * | 2/2000 | Schubert | ..................... | 180/89.13 |
| 6,073,714 A * | 6/2000 | McHorse et al. | ........... | 180/89.14 |
| 6,105,698 A * | 8/2000 | Tsuyama et al. | ............. | 180/89.1 |
| 6,206,121 B1* | 3/2001 | Michel | ....................... | 180/89.13 |
| 6,206,422 B1* | 3/2001 | Goddard | ....................... | 280/788 |
| 6,540,038 B2* | 4/2003 | Taylor et al. | ................ | 180/89.13 |
| 6,742,619 B2* | 6/2004 | Farbotnik et al. | ............. | 180/312 |
| 6,758,294 B2* | 7/2004 | Peddycord et al. | ........ | 180/89.12 |
| 6,817,433 B1* | 11/2004 | Bergstrom et al. | ........ | 180/89.12 |
| 7,077,226 B2* | 7/2006 | Oliver et al. | ................ | 180/89.12 |
| 7,216,925 B1* | 5/2007 | Abele et al. | ............... | 296/190.07 |
| 7,290,829 B2* | 11/2007 | Umemoto et al. | ....... | 296/190.08 |
| 7,331,627 B2* | 2/2008 | Van Den Brink et al. | ......................... | 296/190.07 |
| 7,441,809 B1* | 10/2008 | Coombs et al. | ................ | 280/785 |
| 2003/0226700 A1* | 12/2003 | Peddycord et al. | ........ | 180/89.13 |
| 2006/0255623 A1* | 11/2006 | Haller | ...................... | 296/190.07 |
| 2007/0267894 A1* | 11/2007 | Van Den Brink et al. | ......................... | 296/190.07 |
| 2008/0211265 A1* | 9/2008 | Rochester et al. | ............ | 296/204 |
| 2009/0085377 A1* | 4/2009 | Hayes et al. | ............. | 296/190.07 |
| 2009/0302640 A1* | 12/2009 | Murray et al. | ........... | 296/190.07 |

* cited by examiner

*Primary Examiner* — H Gutman
(74) *Attorney, Agent, or Firm* — McKee, Voorhees & Sease, P.L.C.

(57) ABSTRACT

An air ride system is provided for tractors and other agricultural vehicles to provide a smooth operator ride. The system includes a bracket mounted to the transmission housing beneath the cab. A pair of shock absorbers and a pair of air bags extend between the bracket and the cab so as to absorb forces generated during travel of the vehicle over the ground. A laterally extending control rod provides anti-sway for the cab. Stop members limit the upward and downward travel of the cab relative to the transmission housing. A compressor and air lines allow air to be supplied to or removed from the air bags to adjust the ride.

16 Claims, 5 Drawing Sheets

AIR RIDE SYSTEM FOR A TRACTOR CAB

BACKGROUND OF THE INVENTION

Agricultural vehicles and other earth working machinery typically include a cab for the operator mounted on the frame of the vehicle. Such vehicles include tractors, combines, and harvesters. Such vehicles include engines and transmissions for driving the ground engaging wheels or tracks. Track tractors generally have a rough ride, since the only suspension system is an air ride seat in the cab. Wheeled tractors and vehicles also may have a rough ride, though normally smoother than a track tractor, since the pneumatic tires provide a cushing in effect. A rough ride leads to fatigue of the operator, who drives many hours in the vehicle. A comfortable ride minimizes fatigue, and thus minimizes or eliminates problems associated with or deriving from fatigue.

Therefore, a primary objective of the present invention is the provision of an air ride system for a cab of an agricultural vehicle so as to provide a smoother ride for the vehicle operator.

Another objective of the present invention is the provision of an improved suspension system for providing a smoother ride in the cab of an agricultural vehicle.

A further objective of the present invention is the provision of an air ride system which can be retrofit for the cab of an agricultural vehicle.

Another objective of the present invention is the provision of a kit which can be retrofit to an owner's tractor so as to convert a fixed cab to a floating cab.

A further objective of the present invention is the provision of an air ride system for a vehicle which eliminates vibrations so as to improve the efficiency, accuracy and life of electronic components, including automatic guidance systems, such as GPS.

Still another objective of the present invention is the provision of an air ride system for a tractor cab which is economical to manufacture, durable in use, and simple to install.

These and other objectives will become apparent from the following description of the invention.

BRIEF SUMMARY OF THE INVENTION

The air ride system of the present invention provides a smoother ride for the operator in an agricultural vehicle cab. The system includes a bracket which is mounted to the vehicle transmission housing beneath the cab. The bracket extends substantially across the width of the cab. A shock absorber is mounted at each end of the bracket and is connected to the sides of the cab. An air bag is also mounted at each end of the bracket and connected to the bottom of the cab. A compressor supplies air to the air bags under the cab, as well as to the standard seat air bag in the cab. A control switch allows the operator to selectively adjust the air in the cab air bags and in the seat air bag. A control bar extends between the bracket and the bottom of the cab so as to control lateral movement of the cab. Members are also provided between the bracket and the cab to limit the vertical movement of the cab. Thus, the cab floats, within limits, so as to minimize transfer of forces through the vehicle to the operator as the vehicle travels along the ground. The air ride system also eliminates or minimizes vibrations that may adversely effect the operation, accuracy, and life of some electronic components, such as computer hardware and GPS.

DETAILED DESCRIPTION OF THE PREFERRED EMBODIMENT

Figure 1:
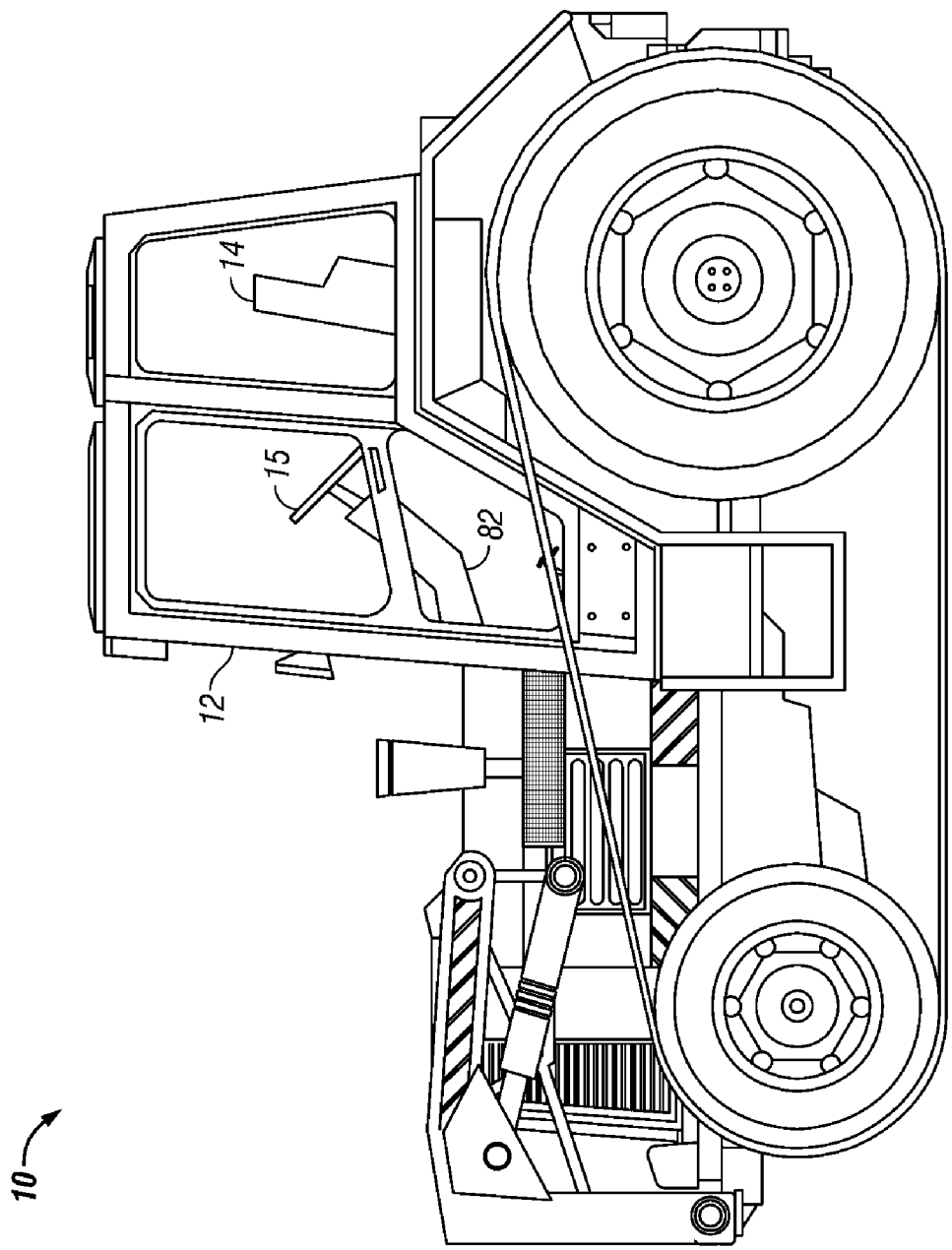
FIG. 1 is a sketch of a tractor cab employing the air ride suspension system of the present invention.

An agricultural vehicle 10 is shown in FIG. 1 as a track tractor, but it is understood that the vehicle 10 may include wheels instead of tracks, and may be a vehicle other than a tractor, such as a combine, harvester, or other earth working machinery. The vehicle 10 includes a cab 12 with a seat 14 for an operator to sit in and a steering wheel 15.

The present invention is directed towards an air ride system or kit for supporting or suspending a cab to provide a smoother ride for the operator. More particularly, the air ride system includes a bracket 16 with resilient members mounted between the bracket and the cab 12 to absorb or dissipate forces otherwise transmitted to the cab 12 as the vehicle moves along the ground.

Figure 2:
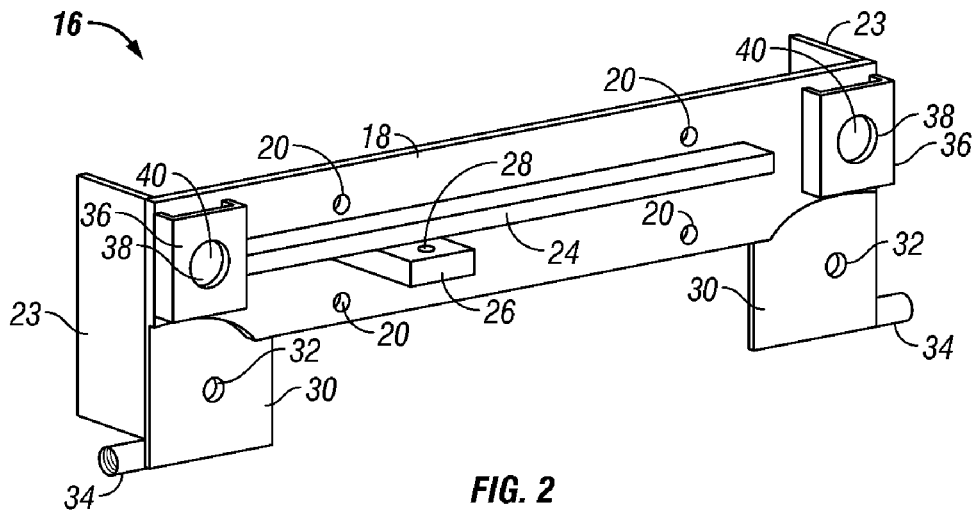
FIG. 2 is a perspective view of the bracket of the air ride system according to the present invention.
Figure 3:
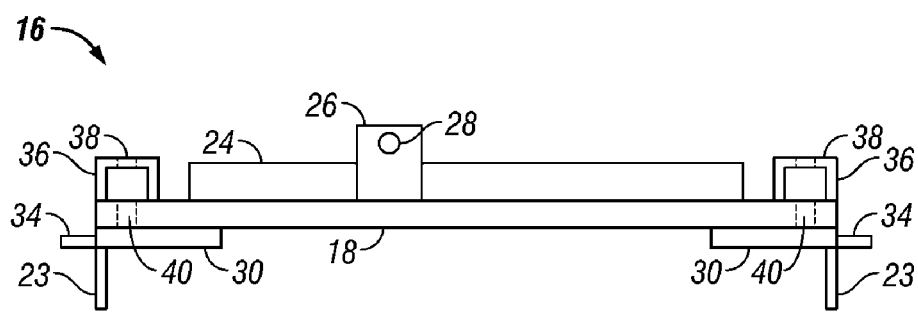
FIG. 3 is a front elevation view of the bracket.
Figure 4:
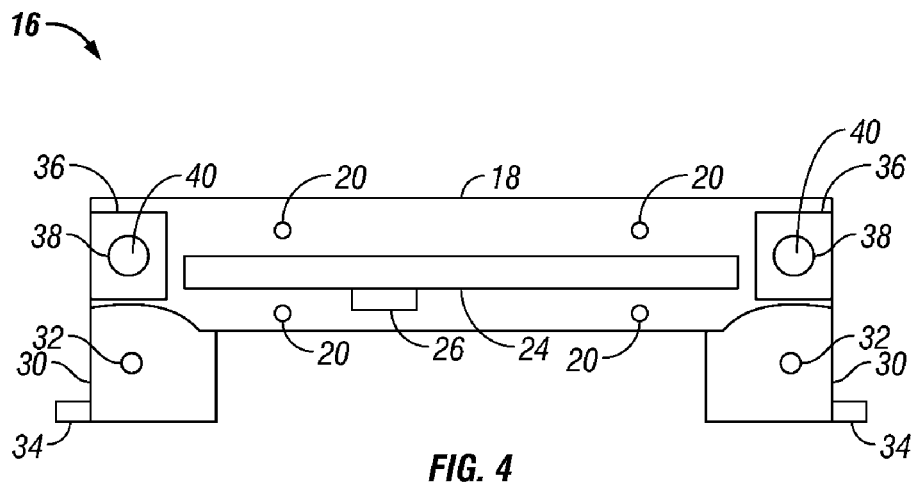
FIG. 4 is a top plan view of the bracket.

The bracket 16 is best seen in FIGS. 2-4. The bracket 16 is elongated so as to extend substantially across the width of the cab 12. The bracket 16 includes a body 18 having a plurality of holes 20 for mounting the bracket 16 to the transmission housing 22 of the vehicle 10 beneath the cab 12. The holes 20 are spaced so as to align with the original threaded holes in the housing used to attach the cab 12 to the housing 22 during assembly of the tractor by the manufacturer. Preferably, the bracket 16 is bolted to the transmission housing 22. The ends of the body 18 preferably have rolled down or welded lips or flanges 23 to increase rigidity of the bracket 16.

A backbone bar 24 is welded to the body 18, and extends substantially along the length of the body 18 so as to provide structural rigidity to the bracket 16. A tab or ear 26 is welded to the body 18 and to the bar 24, and extends upwardly above the bar 24. A hole 28 is provided near the upper end of the tab 26.

A plate 30 extends rearwardly from each end of the bracket 16. Each plate 30 has a hole 32 extending therethrough. Preferably, the plates 30 are welded to the body 18 of the bracket 16. Alternatively, the plates 30 may be extensions of the body.

A tube 34 extends laterally outwardly from each plate 30. A nut is welded on end of the tube 34, or alternately, the outer end of the tube 34 is threaded. Preferably, the tube 34 is welded to the bottom of the plate 30.

A U-shaped member of shelf 36 is also provided at each end of the body 18. Shelves 36 are preferably welded to the body 18. An enlarged hole 38 is provided in each shelf 36 and aligns with a similar hole 40 in the body 18 of the bracket 16.

Figure 5:
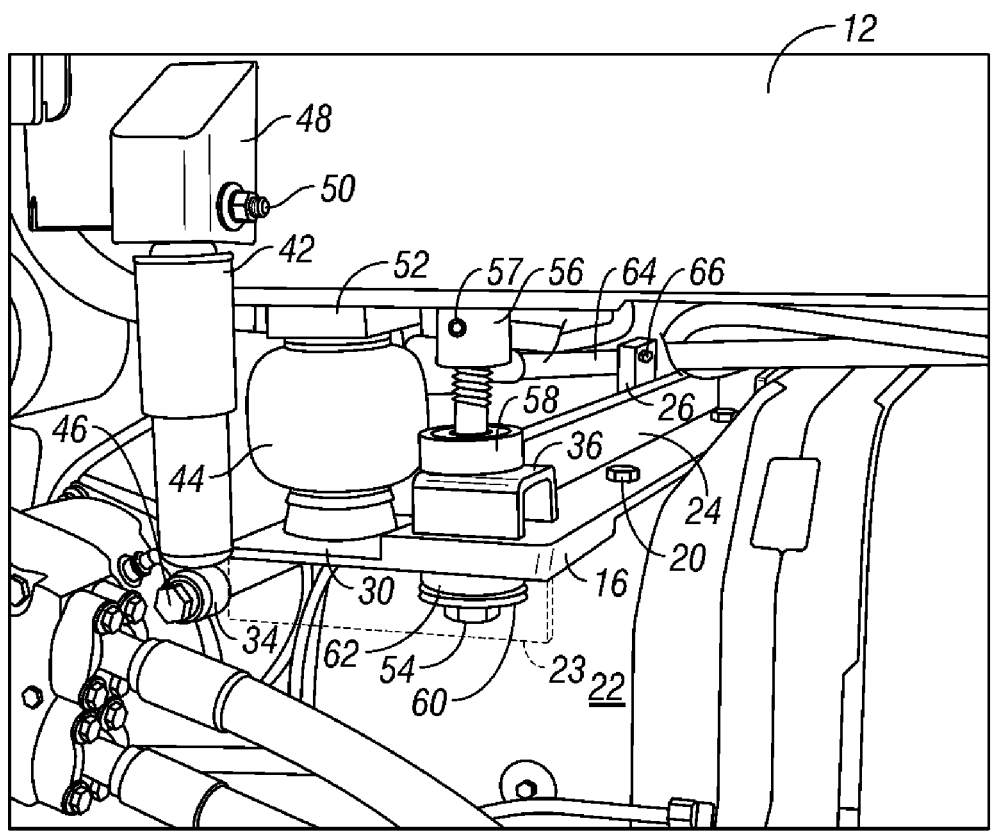
FIG. 5 is a side elevation view showing one end of the bracket mounted to the cab.

The resilient members of the air ride system are shown in the drawings to be a pair of shock absorbers 42 and a pair of air bags 44. The lower end of each shock absorber 42 is mounted to the tube 34 of the bracket 16 by a bolt 46, as best seen in FIG. 5. The upper end of each shock absorber 42 extends into a receptacle or mount 48 welded on each side of the cab 12, and is retained in the receptacle 48 by a bolt or pin 50, as seen in FIG. 5. As an alternative to the shock absorbers 42, the air ride system may include other devices for absorbing forces, such as springs, hydraulic or pneumatic pistons, or the like, residing or extending between the bracket 16 and the cab 12.

The air bags 44 are sandwiched between the bracket 16 and the bottom of the cab 12. The upper end of each air bag 44 is captured or otherwise secured within a collar or disc 52 on the bottom of the cab 12, as best in FIG. 5.

Vertical movement of the cab 12 relative to the transmission housing 22 is limited by elongated stop members or bolts 54 at each end of the bracket 16 extending upwardly through the holes 38 and 40 and threadably coupled to stub tubes 56 extending downwardly from the bottom of the cab, as seen in FIG. 5. Preferably, a set screw 57 is provided in the stub tube 56 for tightening onto the stop limit bolts 54 so that the bolts 54 do not rattle loose from the stub tube 56 during operation of the vehicle 10. A rubber bushing or cushion 58 sits on top of the shelf 36, and has a hole through which the bolt 54 extends. A washer 60 supports another resilient bushing or cushion 62 adjacent the head of the bolt 54 beneath the bracket 16. The bolt 54, washer 60 and bushing 62 limit the upward movement of the cab 12 away from the bracket 16 and transmission housing 22. The cushion 58 on the shelf 36 of the bracket 16 limits the downward movement of the cab 12 relative to the bracket in the transmission housing 22. Additional shims can also be used with the cushion 58 to adjust the travel distance. As seen in FIG. 5, the exposed portion of shaft of the bolt 54 defines the maximum vertical movement or travel of the cab 12 relative to the transmission housing 22. Thus, the air ride system allows the cab 12 to float or travel approximately 1⅞ths inches, and no more than 1½-3 inches, to absorb forces as the vehicle 10 travels along the ground. The stub shaft 56 also assures that a space is maintained between the bottom of the cab 12 and the cross bar 24 of the bracket 16 so that hoses, wires and other lines are not crushed during vertical movement of the cab 12.

Lateral movement of the cab is limited or controlled by a bar or rod 64. The rod 64 has one end connected to the tab 26 of the bracket 16 by means of a bolt 66 secured through the hole 28 of the tab 26. The opposite end of the rod is bolted to a tab 67 welded onto and extending downwardly from the bottom of the cab 12. Thus, the rod 64 is an anti-sway member to limit or control side-to-side movement of the cab 12.

Figure 6:
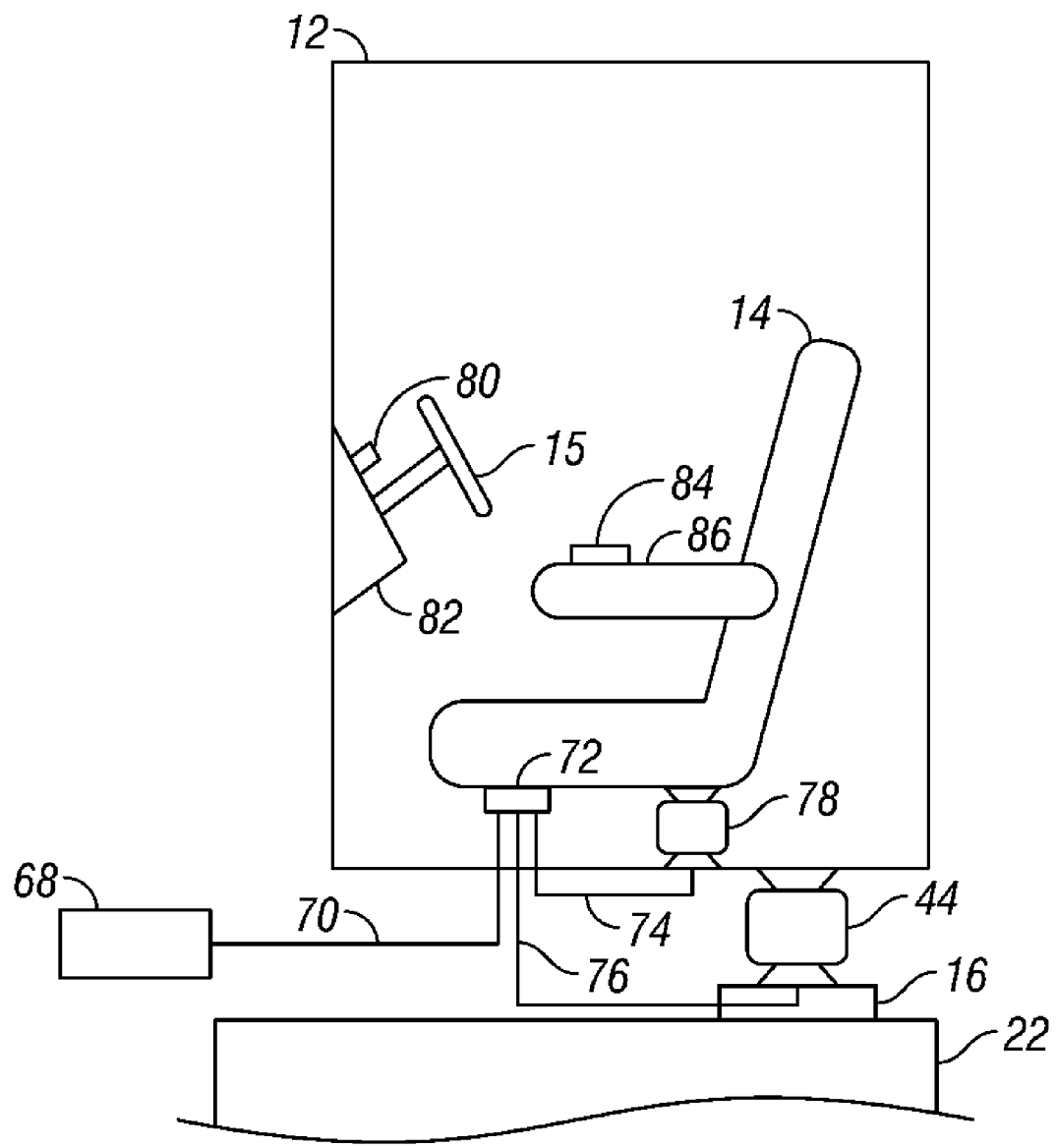
FIG. 6 is a schematic view showing the air bag pneumatic components of the system.
Figure 7:
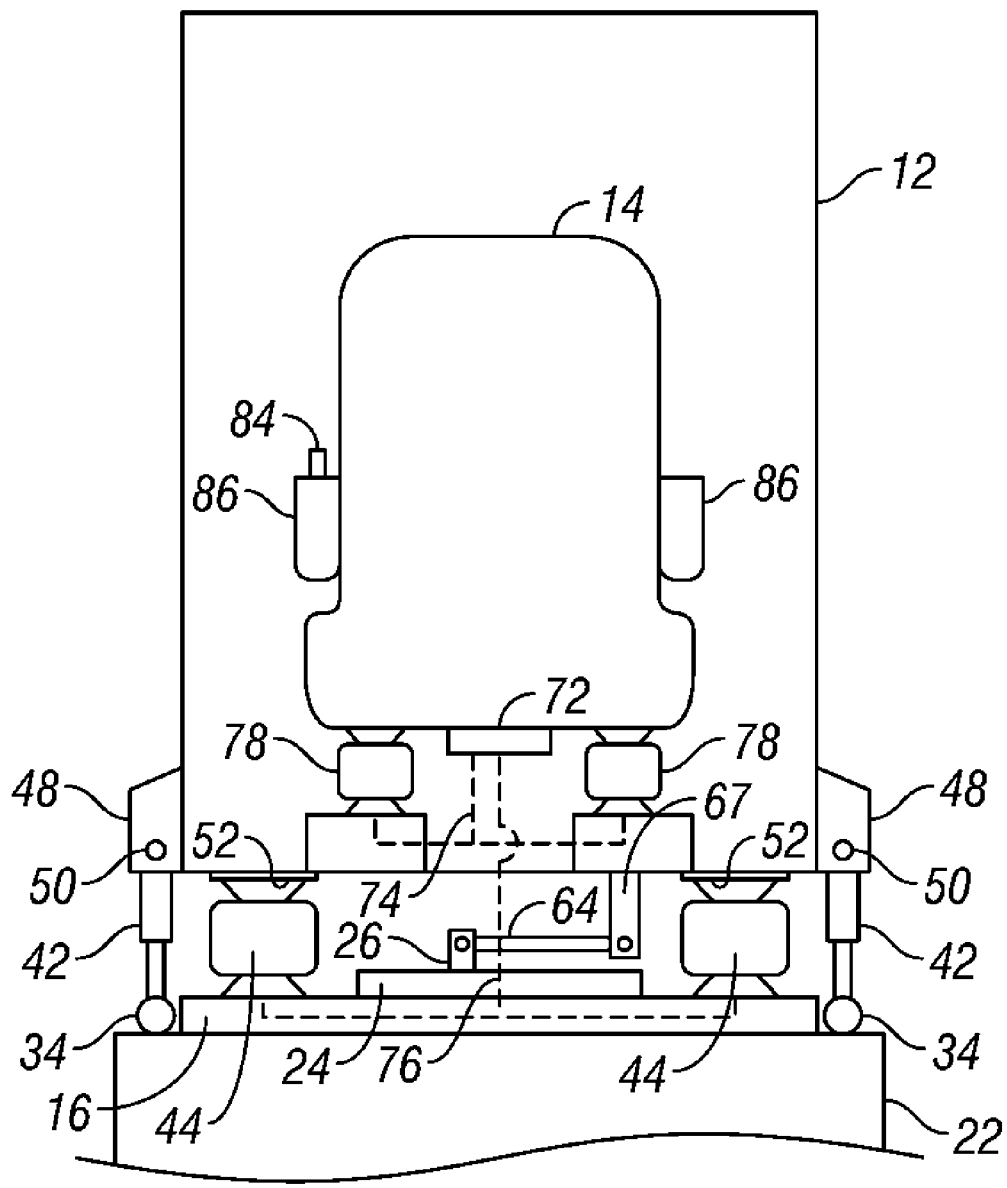
FIG. 7 is a rear elevation schematic (not to scale) showing the air ride system of the present invention.

An air compressor 68, which may be standard on the vehicle 10, supplies air for the air bags 44. More particularly, the compressor 68 includes an air outlet line 70 connected to a valve 72. The valve 72 has two outlet lines 74, 76. The first outlet line 74 is connected to the conventional air bag(s) 78 mounted under the seat 14 in the cab 12. A second air line 76 splits to the air bags 44 beneath the cab 12. The electrical circuitry for the compressor 68 and valve 72 is controlled by an on/off switch 80 mounted on the dashboard 82 of the cab 12. A button 84 is provided for selecting which lines 74, 76 are open and closed to control inflation and/or deflation of the seat air bag(s) 78 and the cab air bags 44. As seen in FIGS. 6 and 7, preferably, the button 84 is mounted on an arm rest 86 of the seat 14.

The air ride system of the present invention is adapted to be retrofit to existing tractors or other agricultural vehicles. The system can also be provided as original equipment.

For a retrofit application, the original cab mounting bolts must be removed, the cab jacked up and blocked, and the rubber body mounts removed. Care must be used during the process to assure that lines, hoses, and the wiring are not damaged. The factory mounted cross member that connects the cab to the transmission housing must be removed and replaced with the bracket 16 of the present invention. Rubber bushings are mounted on the ends of the control rod 64, which is then connected to the bracket 16. The bracket 16 and rod 64 are then slid into position between the cab 12 and the transmission housing 22. The bracket 16 is secured to the transmission housing bolts extending downwardly through the holes 20 and the body 18 of the bracket 16 and into the original threaded holes of the housing 22 for the previously removed original cross member. The bolts 54 are then extended upwardly through the holes 38, 40 of the bracket 16 and into the stub shaft 56 on the bottom of the cab 12.

Next, the anchor tab 67 for the free end of the control rod 64 is welded to the bottom of the cab 12, such that the control rod 64 is substantially parallel to the backbone bar 24 of the bracket 16. The bolts at each end of the control rod can then be tightened.

The air bags 44 are then set into position on the bracket 16. The cab is lowered so that the collars or disks 52 can be welded to the bottom of the cab 12. The air bags 44 may be removed during the welding operation to prevent damage from sparks.

The cushions 58 are set on the shelves 36, and the cab is then lowered onto the cushions 58. Additional shims may be provided on top of the cushions 58 to further limit the downward movement of the cab.

The switch 80 is then installed on the dashboard 82 of the cab 12 and wired to the electrical circuitry of the cab 12. The valve 72 is mounted in the cab 12, preferably under the seat 14, and then pneumatic airlines 70, 74, and 76 are connected. A hole must be drilled in the floor of the cab 12 for the outlet line 76.

Next, the cab is again jacked up and blocked for safety. Small holes are drilled in the tubes 56 for two set screws 57. The stop limit bolts 54 are then threaded into the stub tube 56 and the set screws 57 tightened. The jacks can then be removed and the air bags 44 tested. The bags 44 are fully inflated to assure that the stop limit bolts 54 are set properly. With the cab 12 in the fully raised position, the lower ends of the shock absorbers 42 are secured to the tubes 34 on the bracket 16. The upper ends of the shock absorbers 42 are connected to the shock mounts 48. The shock absorbers 42 are extended to their full length, and then retracted slightly ($\frac{1}{8}^{th}$-¼ inch) as the mounts 48 are welded to the sides of the cab 12. The cab 12 can then be lowered by expelling air from the air bags 44.

The height of the cab 12 is preferably set in the middle of its travel. A ride height indicator (not shown), such as an arrow, can be placed in the cab 12 so as to point to a fixed location that does not travel or move. For example, the indicator can be attached to the conventional computer cover of the vehicle 10. This desired mid-cab height can then be maintained by airing up or down the air bags 44, depending upon the weight of the operator.

Mud flaps or shields (not shown) may be installed on the cab to protect the various components of the air ride system, as well as the lines and wires running beneath the cab 12, from dirt and debris during operation of the vehicle 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:
1. An air ride system for an agricultural tractor having a cab above a transmission housing, the system comprising:
   a bracket mounted to the transmission housing between the cab and the housing, and having opposite ends;

a pair of laterally spaced shock absorbers each having a lower end connected to one end of the bracket and an upper end directly connected to one of the sides of the cab; and a pair of air bags residing between the bracket and the cab adjacent the opposite ends of the bracket and between the shock absorbers.

2. The air ride system of claim 1 further comprising a control bar extending between the bracket and the cab to control lateral movement of the cab.

3. The air ride system of claim 1 further comprising stop members on the bracket to limit vertical movement of the cab.

4. The air ride system of claim 1 further comprising air hoses connected to the air bags and to a compressor to adjust air pressure in the air bags.

5. The air ride system of claim 4 further comprising a switch in the cab operatively controlling air flow from the compressor to the air bags.

6. The air ride system of claim 4 wherein the cab includes a seat with an air bag, and the compressor being connected to the seat air bag.

7. The air ride system of claim 6 further comprising a switch in the cab for controlling air from the compressor to the cab air bags and seat air bags.

8. The air ride system of claim 1 wherein the bracket is adjacent a rear portion of the cab.

9. The air ride system of claim 1 further comprising a mount on each side of the cab to which an upper end of the shock absorbers are fixed.

10. A support system for a cab of an agricultural tractor, the cab having opposite lateral sides and being positioned above a transmission housing of the tractor, the system comprising:

a bracket having opposite ends and attached to the housing beneath the cab;

a pair of shock absorbers connected to the bracket and to the cab and residing outside the sides of the cab in laterally spaced apart relation to one another;

a pair of laterally spaced air bags residing between the cab and housing and between the shock absorbers; and a source of air to selectively adjust inflation and deflation of the air bags.

11. The support system of claim 10 wherein the bracket supports the lower ends of the shock absorbers and lower ends of the air bags.

12. The support system of claim 11 further comprising a bar connected to the bracket and to the cab to control lateral movement of the cab.

13. The support system of claim 11 further comprising stop members connected to the bracket and cab to limit vertical movement of the cab.

14. The support system of claim 10 further comprising a mount on each side of the cab to which an upper end of the shock absorbers are fixed.

15. A support system for a cab of an agricultural tractor, the cab having opposite sides and being positioned above a transmission housing of the tractor, the system comprising:

a bracket connected to the transmission housing beneath the cab;

laterally spaced apart resilient support members having lower ends connected to the bracket and upper ends connected to the cab to allow vertical movement of the cab relative to the housing while the vehicle is traveling;

the support members including shock absorbers and air bags;

the shock absorbers being located outside the cab sides;

a bar connected to the bracket and to the cab to control lateral movement of the cab; and stop members connected to the bracket and to the cab to limit upward and downward movement of the cab.

16. The support system of claim 15 wherein the air bags are between the shock absorbers.

* * * * *